(12) United States Patent
Kim

(10) Patent No.: US 11,455,650 B2
(45) Date of Patent: Sep. 27, 2022

(54) SYSTEM AND METHOD FOR ON-CHAIN REWARDS

(71) Applicant: Coinbase, Inc., San Francisco, CA (US)

(72) Inventor: Peter Jihoon Kim, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 0 days.

(21) Appl. No.: 17/332,693

(22) Filed: May 27, 2021

(65) Prior Publication Data

US 2021/0374791 A1    Dec. 2, 2021

Related U.S. Application Data

(60) Provisional application No. 63/030,692, filed on May 27, 2020, provisional application No. 63/126,891, filed on Dec. 17, 2020.

(51) Int. Cl.
*G06Q 30/02* (2012.01)
*G06Q 20/38* (2012.01)
*G06Q 20/06* (2012.01)

(52) U.S. Cl.
CPC ....... *G06Q 30/0236* (2013.01); *G06Q 20/065* (2013.01); *G06Q 20/389* (2013.01); *G06Q 20/3829* (2013.01); *G06Q 2220/00* (2013.01)

(58) Field of Classification Search
CPC ............ G06Q 30/0236; G06Q 20/065; G06Q 20/3829; G06Q 20/389; G06Q 2220/00; G06Q 20/02; G07F 17/0035
USPC ...................................... 705/14.36
See application file for complete search history.

(56) References Cited

FOREIGN PATENT DOCUMENTS

WO    WO-2017066002 A1 *    4/2017    ......... G06F 16/1805

OTHER PUBLICATIONS

Simoney Kyriakou, Risks and rewards of cryptocurrency, 2018 (Year: 2018).*
Carson, Tony, et al., "EIP-2917: Staking Reward Calculation", https://eips.ethereum.org/EIPS/eip-2917, Aug. 28, 2020.

* cited by examiner

*Primary Examiner* — Tarek Elchanti
(74) *Attorney, Agent, or Firm* — Perkins Coie LLP

(57) ABSTRACT

Systems and methods to at least provide rewards using a smart contract are disclosed.

20 Claims, 10 Drawing Sheets

| Period 0; Unit price: 100 | | |
|---|---|---|
| Name | Cryptocurrency (USDC) Deposited | Units |
| Alice | 5,000 | 50 |
| Bob | 1,000 | 10 |

FIGURE 7A

| Period 1; Unit price: 101 (1% up from 100) | | | |
|---|---|---|---|
| Name | Units | Account Value | Rewards Earned |
| Alice | 50 | 5,050 | 50 (1%) |
| Bob | 10 | 1,010 | 10 (1%) |

FIGURE 7B

| Period 1; Unit price: 101 (1% up from 100) | | | |
|---|---|---|---|
| Name | Units | Account Value | Rewards Earned |
| Alice | 50 | 5,050 | 50 (1%) |
| Bob | 10 | 1,010 | 10 (1%) |
| Charlie | 99.00990099... | 10,000 | 0 |

FIGURE 7C

| Period 2; Unit price: 102.01 (1% up from 101) |||| 
|---|---|---|---|
| Name | Units | Account Value | Rewards Earned |
| Alice | 50 | 5,100.5 | 100.5 (2.01%) |
| Bob | 10 | 1,020.1 | 20.1 (2.01%) |
| Charlie | 99.00990099… | 10,100 | 100 (1%) |

*FIGURE 7D*

| Period 2; Unit price: 102.1 |||
|---|---|---|
| Name | Cryptocurrency (USDC) Deposited | Units |
| Alice | 5,000 + 1,000 = 6,000 | 50 + 9.80296049… = 59.80296049… |
| Bob | 1,000 + 2,000 = 3,000 | 10 + 19.60592098…= 29.60592098… |
| Charlie | 99.00990099… | 99.00990099… |

*FIGURE 7E*

| Period 3; Unit price: 103.0301 (1% up from 102.1) ||||
|---|---|---|---|
| Name | Units | Account Value | Rewards Earned |
| Alice | 59.80296049… | 6,161.505 | 161.505 (2.69%) |
| Bob | 29.60592098… | 3,050.301 | 50.301 (1.68%) |
| Charlie | 99.00990099… | 10,201 | 201 (2.01%) |

*FIGURE 7F*

SYSTEM AND METHOD FOR ON-CHAIN REWARDS

CROSS-REFERENCE TO RELATED APPLICATIONS

This application claims the benefit of U.S. Provisional Application No. 63/030,692 filed 27 May 2020 and U.S. Provisional Application No. 63/126,891 filed 17 Dec. 2020, which is incorporated herein in its entirety for all purposes.

TECHNICAL FIELD

This invention relates generally to the blockchain field, and more specifically to a new and useful system and method for managing rewards from external sources for ownership of cryptocurrency.

BRIEF DESCRIPTION OF THE FIGURES

FIGS. 7A-F are representations of exemplary account balances recorded by a rewarder smart contract, in accordance with variations.

DESCRIPTION OF THE PREFERRED EMBODIMENTS

The following description of the preferred embodiments of the invention is not intended to limit the invention to these preferred embodiments, but rather to enable any person skilled in the art to make and use the embodiments disclosed herein.

1. Overview.

The system and method disclosed herein provide on-chain cryptocurrency rewards processing that reduces (or eliminates) off-chain processing required for a user to receive cryptocurrency rewards.

Figure 1:
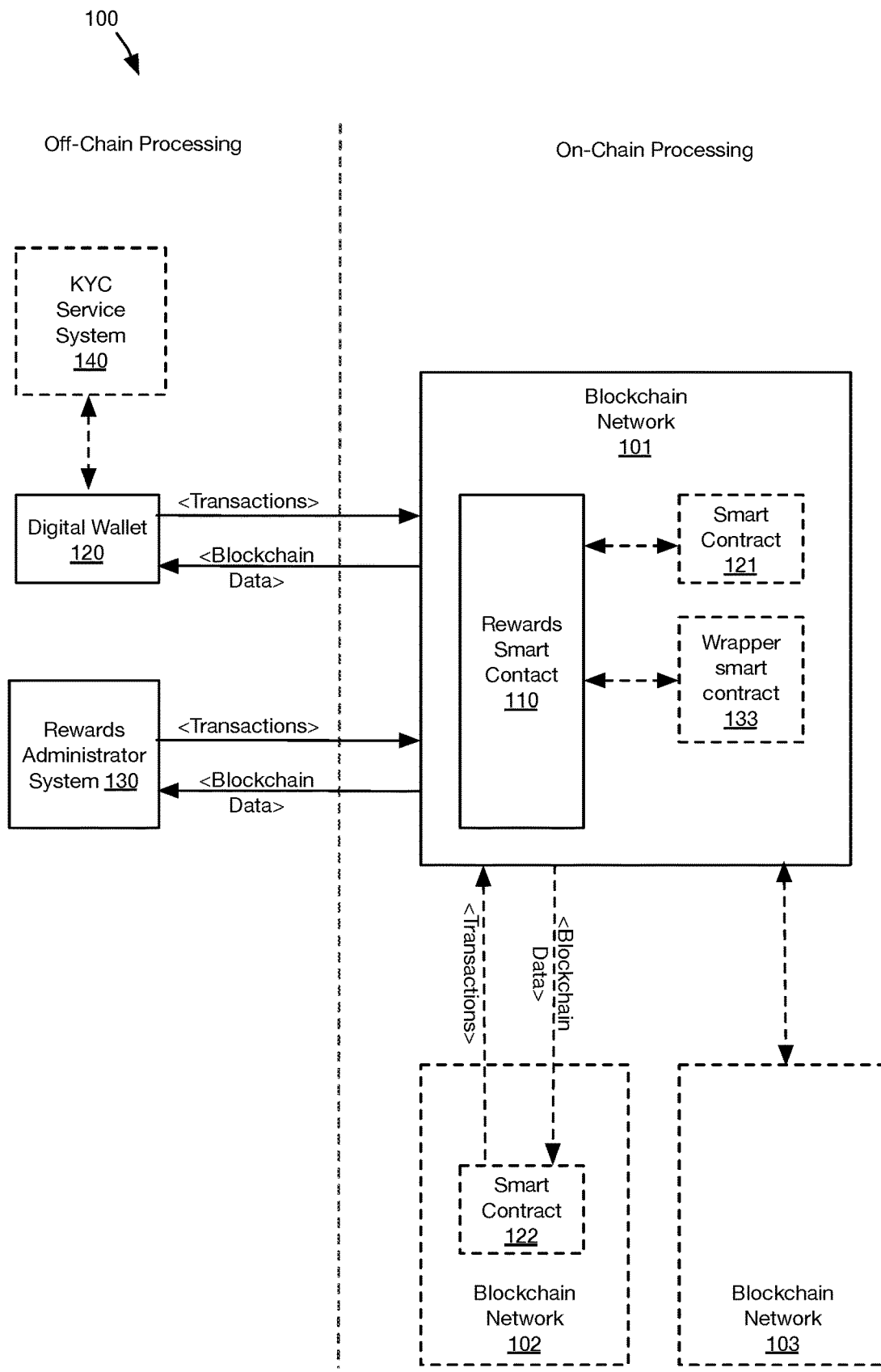
FIG. 1 is a schematic representation of the system, in accordance with variations.

The system includes or is used with a rewards smart contract (e.g., 110 shown in FIG. 1) (executed by a blockchain network, e.g., 101). The smart contract can interact with one or more user digital wallets (e.g., 120), and optionally interact with a token rewards administrator system (e.g., 130), a wrapper smart contract (e.g., 133), and/or other components.

The system can optionally include a KYC (Know Your Customer) service system (e.g., 140). In variants, at least one component of the system performs at least a portion of the method. The method includes at least one of: performing identity verification S205; processing a deposit S210; processing a reward S220; and processing a withdrawal S230. In variants, at least a portion of the method is performed by using the rewards smart contract.

2. Benefits.

This system and method can confer several benefits over conventional systems and methods.

First, this system enables on-chain reward distribution by managing reward tracking and distribution with a smart contract. This can reduce or eliminate off-chain accounting. This also increases the security of user assets and rewards, as it removes the off-chain custodian as a vulnerability.

Second, this system minimizes the amount of on-chain storage and computation performed by the smart contract, which, in turn, minimizes the amount of fees required to maintain this infrastructure. In variants, this is accomplished by decoupling the value of the cryptocurrency (or rewards) from the number of units representing the user's deposited principal. This schema can eliminate per-account value recalculation every time rewards are granted by calculating a single unit price (e.g., which can be decoupled and vary independently from the cryptocurrency's market value), then applying the unit price to the number of units on an as-needed basis (e.g., during principal deposit or withdrawal or payout).

Further benefits are provided by the systems and methods disclosed herein.

3. System.

In some variations, the system 100 functions to provide cryptocurrency rewards processing.

The system 100 includes at least a rewards smart contract 110. In variants, the rewards smart contract 110 functions to perform at least one of: processing a deposit of cryptocurrency that can be used to earn rewards; processing a reward deposited by a rewards administrator system, and processing a withdrawal of cryptocurrency from the rewards smart contract. The rewards smart contract can optionally calculate the reward units for a given user deposit; track the number of reward units per user address; determine the value of each reward unit (e.g., in response to deposits from the token rewards administrator system or address thereof); and/or determine the reward amount per user address based on the respective reward units and value of each reward unit. The rewards smart contract can optionally function as a delegate (e.g., for proof of stake chains), where the rewards smart contract stakes the held assets on behalf of the users and accounts for the rewards per user using the methods described herein, or perform other functionalities. In a first implementation, the rewards smart contract 110 functions to provide on-chain cryptocurrency rewards processing for a single cryptocurrency protocol. In a second implementation, the rewards smart contract 110 functions to provide on-chain cryptocurrency rewards processing for several cryptocurrency protocols.

In variants, the rewards smart contract 110 is a rewards smart contract for a stable coin (e.g., a fiat based stablecoin, or any other suitable type of stable coin). In an example, the rewards smart contract 110 is a USDC rewards smart contract. However, the rewards smart contract can provide rewards or interest for another cryptocurrency asset (e.g., account-based cryptocurrencies, UTXO-based cryptocurrencies, Bitcoin, Ethereum, NFTs, etc.) deposited into the rewards smart contract, or other asset.

In variants, the rewards smart contract 110 is executed by a blockchain network 101. In some implementations, the blockchain network 101 functions to provide a distributed computing environment for execution of one or more smart contracts. The blockchain network can be implemented as a distributed computing system in which several hardware devices provide compute resources for one or more smart contracts. In an example, the blockchain network 101 is an account-based blockchain network that supports smart contracts. However, the blockchain network can be any suitable type of blockchain network.

In variants, the rewards smart contract 110 interacts with one or more digital wallets (e.g., 120, 125) (and optionally interacts with a fiat token rewards administrator system, e.g., 130).

In variants, the subject system provides a wrapper smart contract 133. The rewards smart contract 110 interacts with the wrapper smart contract 133. The wrapper smart contract 133 can be provided on chain, e.g., on blockchain network 101, and the like (e.g., blockchain network 102, blockchain network 103, etc.), but it is appreciated that in at least one embodiment, a given wrapper smart contract could also be provided off chain.

In these variants, the rewards smart contract can function as the storage and processing backend for the wrapper smart contract, wherein the wrapper contract can issue cryptocurrency tokens corresponding to a block of reward units (e.g., a single reward unit, N reward units, etc.), wherein the number of reward units per user deposit can be determined by the smart contract.

In some implementations, the wrapper smart contract 133 enables the digital wallet 120 to convert an existing cryptocurrency asset or token (e.g., ETH, ERC-20, BTC, and the like) into a new wrapped token associated with the rewards (e.g., rewards units). For example, a wrapped bitcoin (WBTC) can be provided that is an ERC-20 (or Ethereum) token representing bitcoin (BTC) on an Ethereum blockchain network, which may be enabled by the digital wallet 120 utilizing the functionality provided by the wrapper smart contract 133. It is further appreciated that converting between (e.g., to and from) the token and the wrapped token can occur at any time (e.g., periodically, arbitrarily, randomly, and the like) in at least an embodiment. The issued tokens can have a different market from the underlying asset (e.g., wherein the issued tokens' price varies relative to the underlying asset's price), can have the same market as the underlying asset (e.g., can be treated as interchangeable), can be pegged to the underlying asset (e.g., have a price that varies with the underlying asset's price), and/or be otherwise related to the underlying asset.

In an illustrative example, a user can deposit 100 USDC into the wrapper smart contract, wherein the wrapper smart contract can optionally verify the user address, log a 100 USDC deposit for the user's address, and send the 100 USDC to the rewards smart contract (e.g., via an onchain transaction). The rewards smart contract can store the 100 USDC, calculate a number of rewards units corresponding to the 100 USDC, store the number of rewards units in association with the wrapper smart contract's address, and return the number of rewards units to the wrapper smart contract. The wrapper smart contract can then mint one or more tokens corresponding to the number of rewards units (e.g., issue T tokens for T reward units, etc.). In a second example, the wrapper smart contract can mint tokens for new rewards (e.g., mint tokens for new rewards received by the rewards smart contract from the token rewards administrator system) and distribute the tokens to users that deposited assets with the wrapper smart contract. However, the wrapper smart contract can mint tokens for any other suitable rewards parameter.

In an implementation, the digital wallet 120 can send a request to the wrapper smart contract 133 to deposit cryptocurrency, which can facilitate minting (discussed further herein) an equivalent amount of the wrapped tokens for the digital wallet 120. In an implementation, the digital wallet 120 can trade (e.g., send a request to withdraw) the wrapped tokens to the wrapper smart contract 133 to receive the original cryptocurrency (e.g., original token) back. Moreover, the wrapper smart contract 133 can interact with the rewards administrator system 130 to enable at least some of the aforementioned functionality for the digital wallet 120. As further illustrated, the wrapper smart contract 133 sends transactions (e.g., requests or messages) to the rewards smart contract 110 for processing, and receives blockchain data from the rewards smart contract 110 resulting for the aforementioned processing of such transactions.

The system can include a KYC (Know Your Customer) service 140 (e.g., authentication system). In some implementations, the KYC service system 140 is registered with the rewards smart contract 110 as a valid verifier. The KYC service system 140 can be registered with the rewards smart contract 110 by broadcasting an Add_Verifier method-activation transaction to the blockchain network 101. In variants, the Add_Verifier method is a method implemented by the rewards smart contract 110, and the Add_Verifier method-activation transaction identifies the rewards smart contract 110. In variants, the rewards smart contract 110 identifies (on the blockchain implemented by the blockchain network 101) the Add_Verifier method-activation transaction. In some implementations, responsive to identifying the Add_Verifier method-activation transaction, the rewards smart contract 110 updates the rewarder smart contract to register the KYC service system 140 as a registered verifier for the rewards smart contract 110. In variants, the reward smart contract 110 optionally verifies the Add_Verifier method-activation transaction before registering the KYC service system 140.

The system can include a rewards administrator system 130 that functions to deposit rewards to the rewards smart contract, specify the price per reward unit (e.g., cryptocurrency-to-unit ratio or conversion), specify the reward growth rate (e.g., APR, cryptocurrency-to-unit conversion), specify the reward period, specify how the price per reward unit should be determined, and/or otherwise control the reward parameters.

However, the administrator system 130 can control and/or perform one or more of: minting of new cryptocurrency assets, purchasing cryptocurrency assets, destroying cryptocurrency assets, redeeming cryptocurrency assets, generating the rewards for the cryptocurrency asset, staking (e.g., as a delegate on behalf of the users), initiating any of the method steps discussed below (e.g., using a signed message or transaction sent to the smart contract), interface between the underlying asset reward system and the rewards smart contract, and/or other functionalities. The rewards administrator system 130 is preferably an (off chain) user interface that generates and sends signed transactions to the rewards smart contract (e.g., in response to user input, in response to an update in the underlying asset reward system, etc.), but can alternatively be an on-chain smart contract, or be otherwise implemented. The rewards administrator system 130 can manage: a single cryptocurrency, multiple cryptocurrencies (e.g., from the same protocol, such as ERC-20 tokens; from different procotols, such as both Ethereum-based and Bitcoin-based cryptocurrencies, etc.), and/or any number or type of cryptocurrencies. In one example, the rewards administrator system 130 manages at least one stablecoin (e.g., a fiat-backed stablecoin, such as USDC). However, the rewards administrator system 130 can perform any suitable cryptocurrency management processes for any suitable cryptocurrency protocol.

The system can optionally include or interface with an underlying asset reward system. This can be used when the cryptocurrency and/or rewards are associated with (e.g., representative of, backed by, etc.) an asset. The asset can be fiat (e.g., USD, Yen, Yuan, Euros, etc.), a commodity (e.g., wheat, chattel, another cryptocurrency, etc.), financial instruments (e.g., stocks, bonds, ETFs, mutual fund shares, promissory notes, etc.), and/or any other suitable asset. The asset itself can earn asset rewards (e.g., interest), wherein the rewards administrator system 130 can selectively generate cryptocurrency rewards (e.g., mint new coins) in response to asset reward earnings (e.g., to match asset reward earnings). Examples of underlying asset reward systems include: one or more bank accounts, investment vehicles (e.g., stocks, bonds, funds, etc.), commodity custodians, and/or other asset management systems.

In some variations, one or more of the components of the system are implemented as a hardware device that includes one or more of a processor, a display device, a memory, a storage device, an audible output device, an input device, an output device, and a communication interface. In some variations, one or more components included in a hardware device are communicatively coupled via a bus. In some variations, one or more components included in the hardware device are communicatively coupled to an external system via the communication interface.

Processors can include one or more of a CPU (central processing unit), GPU (graphics processing unit), NPU (neural processing unit), and any other suitable processing system that functions to execute machine-readable instructions. A processor can execute one or more of the data processors discussed above.

The communication interface functions to communicate data between the hardware device and another device via a network (e.g., a private network, a public network, the Internet, and the like).

In some variations, the storage device includes the machine-executable instructions for performing at least a portion of the method 200 described herein.

In some variations, at least one component of the system 100 performs at least a portion of the method 200 described herein.

5. Method.

Figure 2:
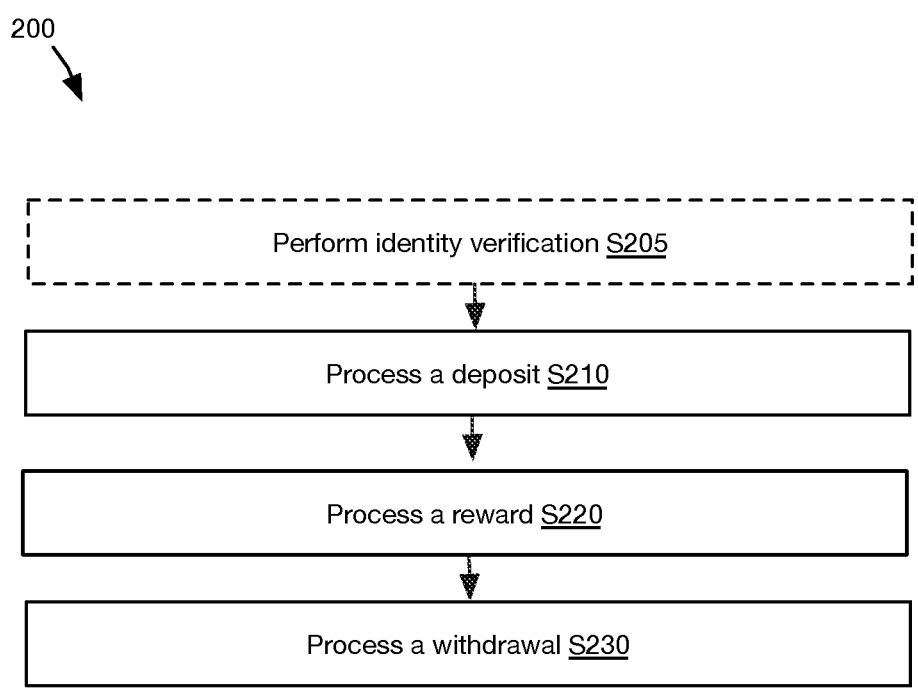
FIG. 2 is a representation of the method, in accordance with variations.
Figure 3:
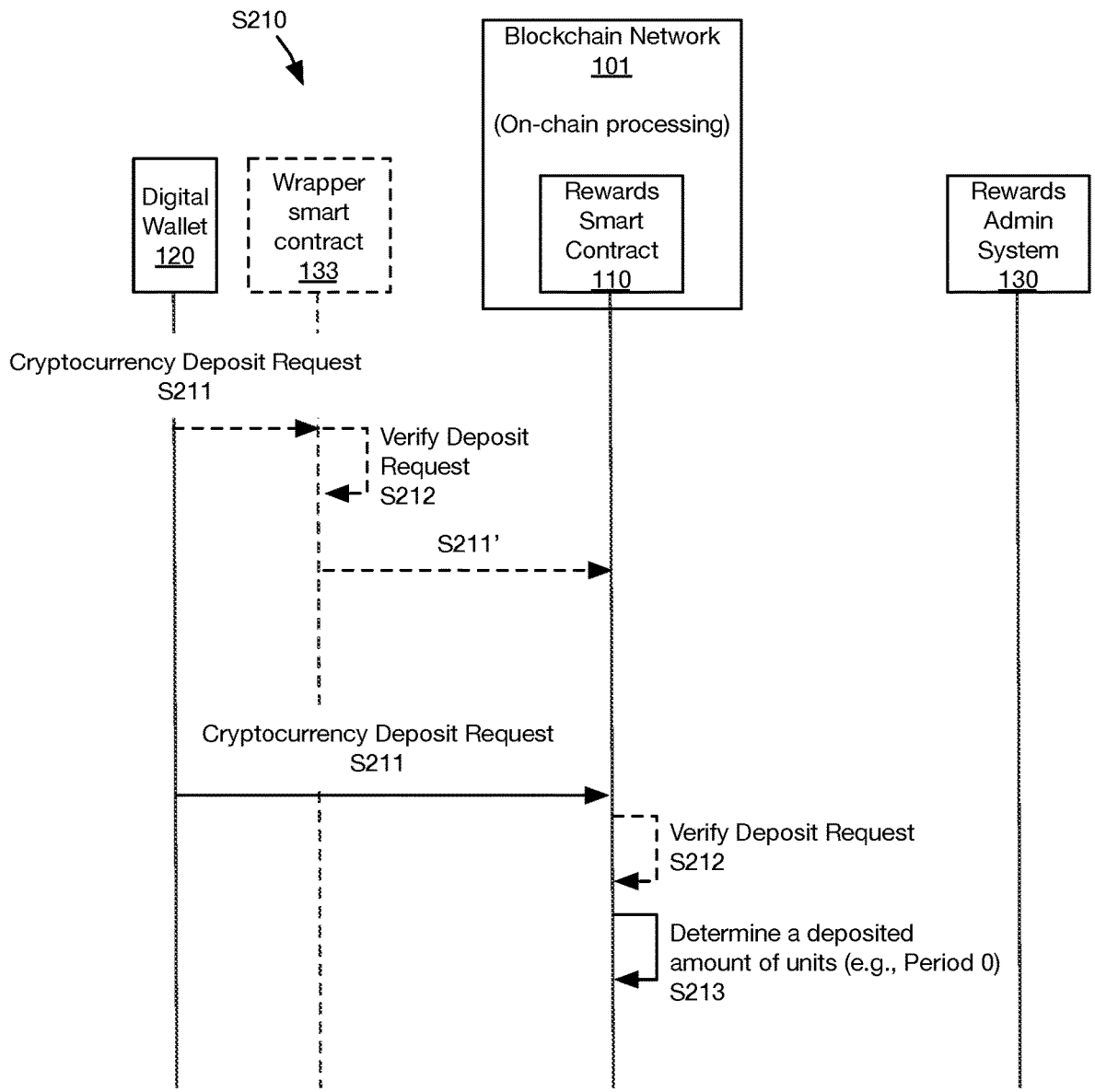
FIG. 3 is a representation of processing a deposit, in accordance with variations.

FIG. 2 is a representation of the method, in accordance with variations.

The method (e.g., 200 shown in FIG. 2) functions to provide on-chain cryptocurrency rewards processing that reduces (or eliminates) off-chain processing required for a user to receive cryptocurrency rewards. The method can be performed for one or more cryptocurrency protocols (implemented by any suitable blockchain network, e.g., 101, 102, 103 shown in FIG. 1). In an example, the method is performed for a stablecoin (e.g., a fiat-backed stablecoin, such as USDC). However, the method can be performed for any suitable cryptocurrency protocol.

For at least one cryptocurrency, the method can function to expand the eligibility of cryptocurrency rewards to anyone holding the cryptocurrency on-chain.

In some variations, the method 200 includes at least one of: processing at least one deposit on-chain S210; processing at least one reward on-chain S220; and processing at least one withdrawal on-chain S230. The method can optionally include performing identify verification S205; providing the smart contract discussed herein; and/or other functionalities. In some variations, at least one component of the system performs at least a portion of the method 200. In some variations, the method is performed by the rewards smart contract 110.

One or more instances of the method can be performed by the same or different smart contract: periodically, in response to a blockchain event (e.g., a rewards event, a reward deposit event, etc.), and/or at any other suitable time.

Performing identity verification S205 can include processing an identity verification attestation for a depositor identifier of a user of the rewards smart contract 110. In a first variation, the depositor identifier is an account of an account-based blockchain protocol. In a second variation, the depositor identifier is an address (e.g., extended public key address, address derived from an extended public key, etc.) of a UTXO-based blockchain protocol. The depositor identifier can be used to provide a cryptocurrency deposit request to the rewards smart contract 110 at S210. In variants, identity verification at S205 is performed off-chain (e.g., separated from a given blockchain network).

Processing at least one deposit on-chain S210 functions to receive a deposit to the rewards smart contract from a user address, which enables the user address to receive (e.g., "earn") rewards through the rewards smart contract.

Figure 9:
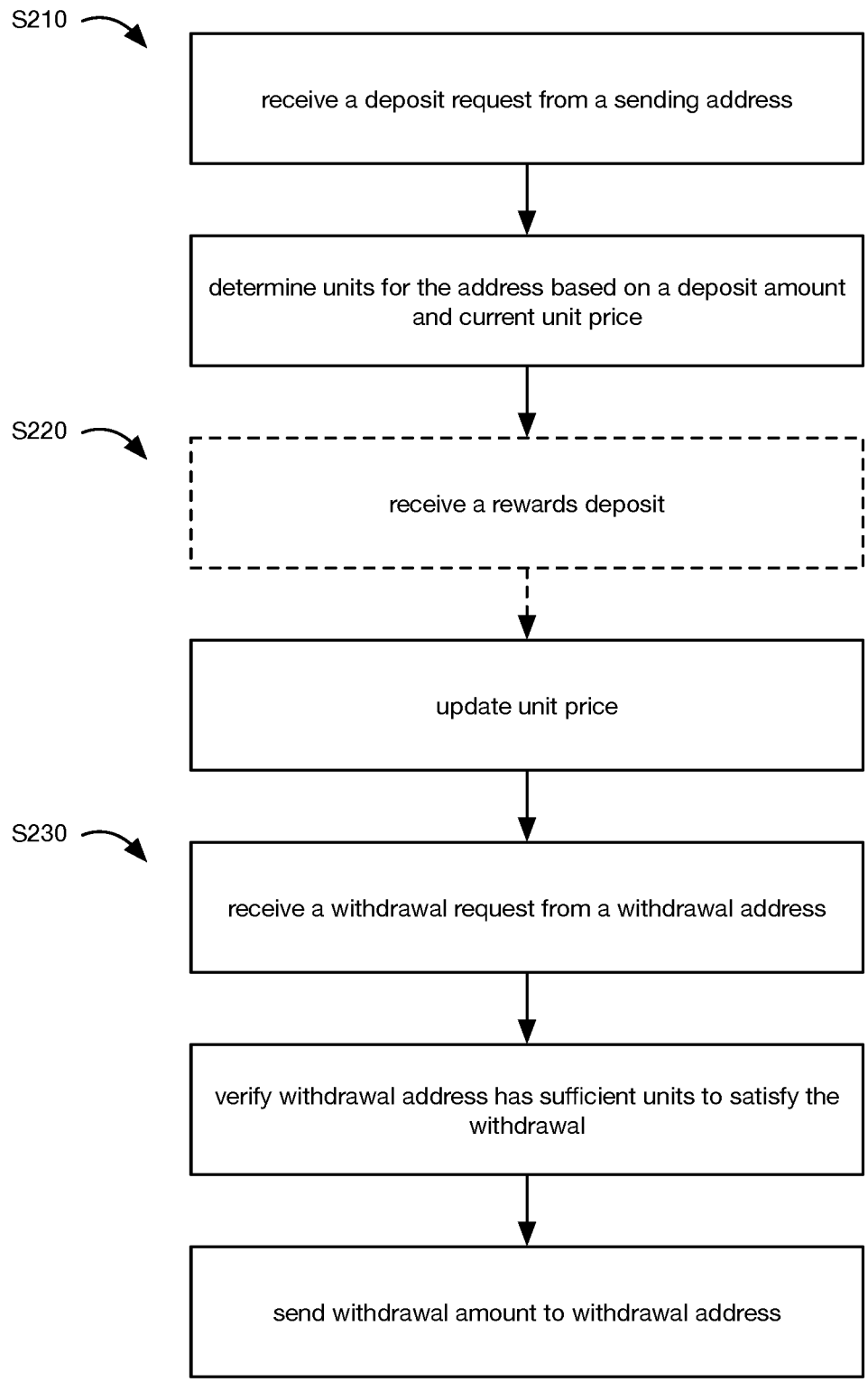
FIG. 9 is a representation of an example of the method.

S210 can be performed: when a blockchain block is mined, when a signed deposit transaction from the user address is received (e.g., by the smart contract) (example shown in FIG. 9), and/or at any other suitable time. S210 can be performed atomically (e.g., within a single blockchain block), asynchronously, across multiple blocks, or otherwise performed. S210 is preferably performed using one or more signed transactions (e.g., signed by the private key associated with the depositing address or the user address; wherein gas is consumed), but can be otherwise performed.

S210 can include: identifying a cryptocurrency deposit request S211; optionally verifying the cryptocurrency deposit request S212; determining a number of reward units for the deposit S213; and storing the number of reward units in association with a user identifier (e.g., the user address; hash thereof; etc.).

Identifying a cryptocurrency deposit request S211 functions to determine user intent to deposit a cryptocurrency asset into the smart contract. S211 can include receiving the deposit request at the rewards smart contract (example shown in FIG. 9), identifying the mined deposit request using an offchain blockchain monitoring system, and/or otherwise identifying the deposit request. The deposit request is preferably a signed blockchain transaction identifying the rewards smart contract address (e.g., as an address hash, etc.), the amount of cryptocurrency to be deposited, the type of cryptocurrency being deposited (e.g., ETH, USDC, etc.), an invocation of the deposit function of the rewards smart contract, the sending address (e.g., the user address, the depositing address, the wrapper smart contract address, etc.), and/or other information. The deposit request is preferably signed by the private key associated with the sending address (e.g., the user's blockchain address), but can be otherwise signed. However, the deposit request can be an offchain request (e.g., to an offchain smart contract interface) and/or be any other suitable request.

In a first variant, the deposit request is provided (e.g., to a blockchain network 101 that executes the rewards smart contract 110) by a digital wallet (e.g., 120), which can facilitate deposit request generation, signing, and blockchain broadcast. The digital wallet can be any suitable type of digital wallet (e.g., a custodial digital wallet, a non-custodial digital wallet, etc.). The digital wallet can be a user digital wallet, or an exchange digital wallet. The digital wallet is executed by a computing device. The computing device can be a user computing device, a cloud-based server that provides a computing platform (e.g., a hosted digital wallet platform, a cryptocurrency exchange, etc.).

In a second variation, the deposit request can be provided by a smart contract (e.g., 121, 122) executed by a blockchain network (e.g., 101, 102). For example, the deposit request can be provided by a wrapper smart contract S133. In this example, the wrapper smart contract 133 can receive the deposit request from the digital wallet 120, and then provides the request to the rewards smart contract 110 for processing as discussed further herein (e.g., storing the deposit in association with the digital wallet 120). It is appreciated, however, the cryptocurrency deposit request can be provided (at S2n) by any suitable system that functions to generate (and optionally sign) a cryptocurrency deposit request, and broadcast the cryptocurrency deposit request to the blockchain network 101 that executes the rewards smart contract 110.

In an example, the deposit request (identified at S211) is a deposit request for depositing an amount of a stablecoin (e.g., fiat-backed stablecoin, such as USDC), and the request identifies an amount of the stablecoin to be deposited. In some implementations, in which the rewards smart contract 110 processes rewards for several cryptocurrency protocols (e.g., implemented by blockchain networks 101, 102, 102), the deposit request identifies the cryptocurrency protocol for the cryptocurrency being deposited.

In variants, the cryptocurrency deposit request is a signed blockchain transaction (e.g., signed by a private key of the user, associated with the depositing or verified address). In an example, the signed blockchain transaction is a deposit method-activation transaction for a deposit method of the rewards smart contract 110.

In variants, the deposit request is received (or recognized on-chain) by the rewards smart contract 110.

In variants, identifying the cryptocurrency deposit request S211 includes: the rewards smart contract 110 identifying, on a blockchain (e.g., implemented by the blockchain network 101 that executes the rewards smart contract 110, or a different blockchain network, e.g., 102, 103), a deposit method-activation transaction that identifies the deposit method of the rewards smart contract 110 and optionally specifies one or more deposit method parameters. In an example, the deposit method activation transaction identifies a source parameter that identifies a source of the cryptocurrency to be deposited, and a value parameter that identifies a value of the cryptocurrency to be deposited. In an example, the deposit method activation transaction identifies a depositor identifier (e.g., a user identifier that identifies a user of the rewards smart contract 110). The depositor identifier can be a blockchain account (e.g., an Ethereum account used to interact with the rewards smart contract 110).

Processing at least one deposit on-chain S210 optionally includes: verifying the cryptocurrency deposit request S212. Verifying the deposit request S212 can include determining whether the rewards smart contract 110 has verified (e.g., at S205) a depositor identifier associated with the deposit request. In variants, deposit requests that have not been verified at S212 are rejected (e.g., not processed).

Determining a number of reward units for the deposit S213 functions to abstract the deposit amount, which changes over time due to reward accrual, to a value that is constant over time. This abstraction allows the smart contract to save processing fees (e.g., mining fees, gas) by minimizing smart contract state changes, since each additional computation (state change) costs processing fees. The units are preferably dimensionless (e.g., unitless), but can alternatively have units. The units are preferably cryptocurrency price agnostic, but can alternatively vary with the cryptocurrency price.

For example, instead of recomputing each user's updated balance after each reward period, the rewards smart contract can simply track each user's reward units in a ledger, and only update the price per reward unit (e.g., amount of cryptocurrency corresponding to each reward unit; cryptocurrency-to-unit ratio) after each reward period. In an illustrative example, if the rewards smart contract handled the rewards for N users, using the rewards units (instead of the deposit amount) can decrease the number of computations for a reward period from N computations (e.g., one for each user) down to 1 computation (e.g., one for the price per reward unit). However, the reward unit can be equivalent to the deposited amount, or be otherwise defined.

S213 can be performed after deposit request receipt (example shown in FIG. 9), performed in response to successful verification of the deposit request at S212, or at any other suitable time. S213 can be performed by the rewards smart contract 110, by an offchain system, and/or by another system. When S213 is performed by an offchain system, the offchain system can detect the deposit transfer to the rewards smart contract (e.g., by monitoring for blockchain events associated with the rewards smart contract, etc.), calculate the rewards units, and send another transaction (from the offchain system) to the rewards smart contract to update the rewards unit balance for the sending address. However, S213 can be performed by another system.

S213 can include: determining the deposited amount of units by identifying a current unit price for the deposited cryptocurrency, dividing the deposited amount of the cryptocurrency by the current unit price for the cryptocurrency, and optionally storing the amount of reward units in association with a depositor identifier. The depositor identifier can be: the sending address, hash thereof, user name, and/or other identifier. S213 can optionally include converting the deposited amount of units to a larger multiple of the deposited cryptocurrency, which can work around decimal math limitations of a blockchain (e.g., Ethereum does not have a decimal data type, so deposited cryptocurrency can be converted to integers first by multiplying by $10^{18}$, $10^{20}$, $10^N$, and/or another multiple to provide N decimal places of precision). However, S213 can be otherwise performed.

S210 can optionally include facilitating underlying asset transfer to the underlying asset reward system, such that rewards (e.g., interest) generated by the underlying assets corresponding to the newly-deposited cryptocurrencies can be allocated to the rewards smart contract for subsequent distribution. This can include: detecting the on-chain deposit (e.g., by monitoring for blockchain events emitted by the rewards smart contract); and transferring the underlying assets, corresponding to the deposited amount, to the underlying asset reward system in response to on-chain deposit detection. Transferring the underlying assets can include: earmarking the underlying asset for rewards generation, transferring the underlying assets to the underlying asset rewards system's offchain account (e.g., bank account, brokerage account, etc.; using an in-kind transfer, automatic withdrawal, etc.), or otherwise transferring the underlying assets. The underlying assets can be transferred by: a custodian custodying the underlying asset corresponding to the sender's cryptocurrencies; the sender; and/or any other suitable entity.

Processing a reward S220 functions to receive rewards at the rewards smart contract, which results in the sending address (e.g., user address, wrapper smart contract address, etc.) "earning" the rewards.

S220 can be performed: when a blockchain block is mined, when a signed rewards transaction from the rewards administrator system 130 is received (e.g., by the smart contract) (example shown in FIG. 9), periodically (e.g., each reward period), and/or at any other suitable time.

The length of each reward period can be set by a rewards administrator system (e.g., 130). In an example, the length of each period is two weeks, so as to provide ample time for treasury operations such as minting additional cryptocurrency (e.g., USDC tokens) from interest earned. However, periods can have any suitable length, and in some embodiments, such periods may vary from period to period (e.g., a first period has a first length, and a second period has a second length that is different than the first period).

S220 can be performed atomically (e.g., within a single blockchain block), asynchronously, across multiple blocks, or otherwise performed. S210 is preferably performed using one or more signed transactions (e.g., signed by the private key associated with the depositing address or the user address; wherein gas is consumed), but can be otherwise performed.

Figure 4:
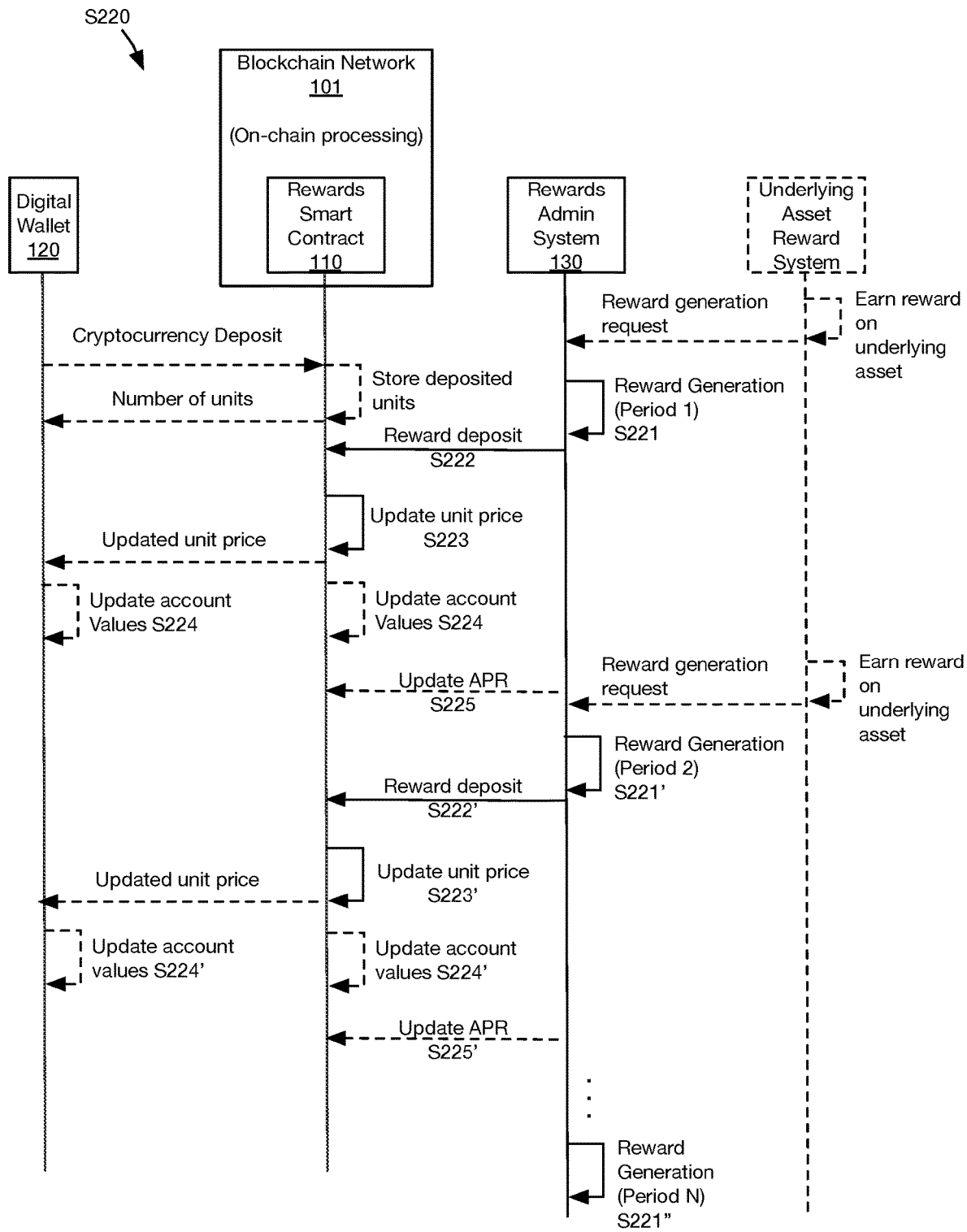
FIG. 4 is a representation of processing a reward, in accordance with variations.

S220 can include: identifying a rewards deposit S222; and updating the current unit price (example shown in FIG. 4). However, S220 can be otherwise performed.

Identifying the rewards deposit S222 can include detecting a rewards deposit transaction (e.g., by the rewards smart contract). The rewards deposit transaction can be a signed blockchain transaction identifying: the rewards smart contract address (e.g., as an address hash, etc.), the amount of rewards (e.g., cryptocurrency) to be deposited, the type of rewards being deposited (e.g., ETH, USDC, etc.), an invocation of the rewards deposit function of the rewards smart contract, the rewarding address (e.g., the rewards administrator system address, the underlying address reward system's address, etc.), and/or other information. For example, the rewards deposit can include a blockchain transaction, signed by the rewards administrator system 130, transferring the rewards (e.g., earned interest) for all deposits held by the rewards smart contract (e.g., during the reward period) to the rewards smart contract. However, the rewards deposit can be an instruction to change the unit price (e.g., in a transaction signed by an authorized administrator), or be any other suitable transaction.

Updating the current unit price S223 functions to account for sending account reward earnings. The current unit price is preferably updated in S22o, but can alternatively remain unchanged. The rewards smart contract can maintain a log of all historic unit prices, or not maintain the log. In the latter instance, an external system can query the rewards smart contract (e.g., using a call, a gasless call, etc.) each rewards period to obtain the current unit price and log the unit price history offchain; alternatively, the unit price history can be unlogged.

The current unit price can be specified by the rewards administrator system 130, be automatically determined by the rewards smart contract, and/or otherwise determined.

In a first variation, the current unit price is specified by the rewards administrator system 130. In this variation, the rewards administrator system 130 can send a signed transaction (signed by the rewards administrator system's private key) to the rewards smart contract 110 to update the stored current unit price. This can be performed per reward period, or at any other suitable time. In an example, the rewards administrator system 130 can specify the APR for the reward period S225, wherein the current unit price for said reward period can be calculated from the APR.

In a second variation, the current unit price is automatically calculated by the rewards smart contract. This can be performed when a reward deposit is received from the rewards administrator system 130 (e.g., from the rewards administrator system's address), when received deposits are marked as rewards in the transaction, and/or at any other suitable time.

The current unit price can be determined based on the total amount of cryptocurrency held by the smart contract (e.g., is decoupled from the cryptocurrency market value). Alternatively, the unit price is determined based on the cryptocurrency market value, arbitrarily determined, determined based on a rewards rate per reward period, or determined utilizing any other appropriate technique(s). The unit price can have units of cryptocurrency per unit, fiat per unit, or any other suitable units.

In a first variant, the unit price is arbitrarily set (e.g., upon smart contract initialization).

In a second variant, the unit price can be determined by dividing the total amount of cryptocurrency held by the smart contract (e.g., the number of USDC deposited to the smart contract and number of rewards granted to the smart contract, etc.) by the number of total units allocated to all users.

In a third variant, the unit price can be determined based on the reward rate per period (r) and the prior unit price (e.g., unit price$_t$=(i+r)·unit price$_{t-1}$) or a base unit price (e.g., unit price$_t$=(i+r)·unit price$_{base}$). In this variant, the reward rate per period (r) can be automatically determined, determined by the rewards administrator system, and/or otherwise determined. In an example, the reward rate per period is equal to the predetermined annual percentage rate (APR) divided by a number of periods in a year. In some implementations, the APR does not take compounding into account. For example, if the APR is 12%, and there are 12 periods in a year, then the reward rate is 1%. In another example, the reward rate can be determined based on the amount of underlying asset rewards that were earned (e.g., associated with the cryptocurrency amount held by the smart contract). However, the reward rate can be otherwise determined.

In a fourth variant, the unit price can be calculated based on the amount of new rewards received over the reward period.

In a fifth variant, the current price can be determined by dividing the total amount of cryptocurrency held by the smart contract by the total amount of deposits (e.g., over all time, over the reward period, etc.).

In a sixth variant, the rewards smart contract 110 updates the unit price at S223 by identifying the reward rate per period (per-period reward rate) (e.g., APR/<number of periods in a year>), multiplying the last unit price by the per-period reward rate to identify the change in unit price, and adding the change in unit price to the last unit price, thereby yielding the new unit price, as shown in Equation 1:

New Unit Price=(<per-period reward rate>+100%)
*<last unit price>

In a seventh variant, the rewards smart contract 110 updates the unit price at S223 as shown in Equation 2:

New Unit Price=[(<current time−last updated time in seconds>/<seconds in a year>*APR+100%]
*<last unit price>

However, the unit price can be otherwise determined.

S220 preferably does not update the individual balance for each sending address (e.g., does not update the total account value, does not calculate the total rewards earned per user, etc.) after the reward is received. The individual balance for a user is preferably calculable offchain, wherein a user can query the rewards smart contract for the unit balance of a sending address, the current unit price, and calculate the sending address' total account value, including the deposit and earned rewards, based on the unit balance and current unit price (e.g., by multiplying the values).

For example, FIG. 7A shows exemplary account values at the beginning of Period 1, where the unit price is 100, Alice has 50 units (e.g., 5,000 deposited cryptocurrency assets/100 cryptocurrency assets per unit), and Bob has 10 units (e.g., 1,000 deposited cryptocurrency assets/100 cryptocurrency assets per unit). In this example, the senders (Alice and Bob) are represented by their names for ease of reference; the rewards smart contract would not necessarily track balances by the sender names, but rather track balances by the sender's identifiers (e.g., their blockchain address, unique identifier, etc.). FIG. 7B shows exemplary account values using updated unit prices determined at S223, for Period 1. As shown in FIG. 7B, the unit price has increased 1% to 101 (from the last unit price of 100, shown in FIG. 7A for Period 0). Accordingly, Alice's account value has increased 1% to 5,050, reflecting a 1% reward earned by Alice at Period 1. Similarly, Bob's account value has increased 1% to 1,010, reflecting a 1% reward earned by Bob at Period 1. As can be seen, the rewards smart contract only needs to store the units per sender for the account value to be calculated by an offchain system. By virtue of distributing rewards by updating a unit price for each, account-specific and deposit-specific calculations do not need to be performed to identify rewards earned by users.

Alternatively, S220 can update each sending address' individual balance S224. For example, the rewards smart contract 110 stores data on-chain that identifies the total account value and total rewards earned for each user of the rewards smart contract 110 (e.g., Alice's identifier, Bob's identifier, Charlie's identifier, etc., shown in FIGS. 7C and 7F). As new rewards are earned for a user, the total account value and total rewards earned for the user are updated.

S220 can optionally include distributing rewards and/or making rewards available for withdrawal after each period (e.g., Period 1, Period 2, Period N, etc.).

In a first variant, at the end of each period (e.g., Period 1 shown in FIG. 4), reward generation is triggered (e.g., by the rewards admin system 130 (at S221). In a first variant, the rewards admin system 130 acquires new cryptocurrency for the generated reward S221, and optionally transfers the newly acquired cryptocurrency for the reward to the rewards smart contract 110 (e.g., by broadcasting a blockchain transaction to the blockchain network 101, or another blockchain network). In some implementations, the new cryptocurrency can be acquired by minting new cryptocurrency (e.g., when the underlying asset's value increases, when interest is earned on the underlying asset, etc.) or purchasing new cryptocurrency from an exchange or third party.

In a second variant, the rewards admin system 130 transfers an amount of cryptocurrency to the rewards smart contract 110 that can be used to fund rewards for several reward periods, thereby removing the need to periodically transfer funds to the rewards smart contract. However, the rewards admin system 130 can transfer cryptocurrency to the rewards smart contact 110 at any suitable time and frequency, and in any suitable amount, such that the rewards smart contract 110 has sufficient funds to process rewards withdrawals at S230.

In a third variant, the rewards admin system 130 broadcasts a reward settlement method-activation transaction to the blockchain network 101. Prior to broadcasting the rewards settlement method-activation transaction, the rewards admin system 130 can determines whether the rewards smart contact 110 has sufficient funds for the new reward (triggered by the reward settlement method-activation transaction). The rewards admin system 130 can identify the total funds held by the smart contract 110 by accessing blockchain data, by invoking a method of the smart contract 110, or by using any other suitable process. In some implementations, if the smart contract 110 does not have sufficient funds, the admin system 130 deposits additional funds to the smart contract 110.

Alternatively, rewards can be available for withdrawal continuously, before the reward period is over, or at any other time.

In these variations, the rewards smart contract 110 permits withdrawals at any time, and allows rewards to accrue even when funds are deposited or withdrawn mid-cycle by tracking two types of unit prices and account values. The first type of unit price is a pending unit price, and the second type of unit price is a shared or settled unit price (unit price at the time the next reward is processed). Similarly, the first type of account value is a pending account value, and the second type of account value is a shared account value (account value at the time the next reward is processed).

When deposits are made, a pending unit price is calculated based on the current time (which is before the time at which the next reward is processed). This ensures that the deposits that are made mid-cycle only earn a partial amount of the rewards for that period. The number of units issued is the amount of cryptocurrency (e.g., USDC) deposited divided by the pending unit price. Similarly, the pending unit price is again determined when a withdrawal is made, to determine how much shares to deduct from a corresponding account. This allows rewards to be paid even if withdrawals are made prematurely prior to the end of the period.

The pending account value is the number of units multiplied by the pending unit price, and can always be greater than or equal to the settled account value (the account value at the time of the next reward), which is the number of units multiplied by the settled unit price (the unit price at the time of the next reward). Users will only be able to withdraw the full amount of the pending account value, after the reward for the next period is processed (e.g., settlement occurs) and the settled price and settled account value are updated. This is because the newly minted cryptocurrency to cover reward payments are only transferred to the rewards smart contract (e.g., by the rewards admin system 130) (or authorized to be issued by the smart contract no) at the end of each period and it is not guaranteed that the rewards contract is fully solvent prior to the settlement.

However, rewards can be available for withdrawal at any suitable time, with the rewards calculated in any suitable manner.

In variants, the reward settlement method is a method implemented by the rewards smart contract 110, and the reward settlement method-activation transaction identifies the rewards smart contract 110.

In variants, at S222 (as shown in FIG. 4), the rewards smart contract 110 (executed by the blockchain network 101) identifies (on the blockchain implemented by the blockchain network 101) the reward settlement method-activation transaction that was broadcasted by the rewards admin system 130 (at S222). In some implementations, responsive to identifying the reward settlement method-activation transaction, the rewards smart contract 110 updates the current unit price (at S223).

In some implementations, the rewards smart contract 110 validates the reward settlement method-activation transaction before it updates the current unit price at S223. Validating the reward settlement method-activation transaction can include validating that the transaction broadcasted by an authorized system (e.g., the rewards admin system 130) (e.g., by confirming that the transaction was signed by a private key of the rewards admin system 130).

Validating the reward settlement method-activation transaction can include performing a validation check to make sure that the smart contract 110 holds sufficient funds for processing withdrawal requests (at S230) based on an updated current unit price (settled unit price) that would result from processing the reward settlement method. In an example, the rewards smart contract 110 performs the validation check by ensuring that the total amount of funds held is greater than the product of: a) the total units owned by users of the smart contract 110 and b) the settled unit price (e.g., Total Funds>=[Total Units]*[Settled Unit Price]). In some implementations, if the smart contract does not have sufficient funds, the reward settlement method is ignored (e.g., not executed). In variants, if the smart contract does not have sufficient funds, the rewards smart contract 110 sends a notification to the rewards admin system 130 informing the admin system 130 of the deficiency in funds.

In variants, the rewards smart contract 110 ensures that all settled account value is fully withdrawable. When a reward is deposited (e.g., at S222), the rewards smart contract 110 checks whether the liabilities (total settled account value=total units×settled unit price) are fully covered by the cryptocurrency balance of the rewards smart contract 110. If the update in the settled unit price causes the rewards smart contract 110 to be insolvent, the reward processing performed at S220 fails, and the reward deposit is reverted. Additional cryptocurrency will have to be transferred to the rewards smart contract 110 to be able to cover the liabilities fully before the reward is processed again at S220.

In variants, the APR can change (e.g., at S225 shown in FIG. 4). In variants, the rewards admin system 130 changes the APR by broadcasting (at S225) an APR update method-activation transaction to the blockchain network 101. In variants, the APR update method is a method implemented by the rewards smart contract 110, and the APR update method-activation transaction identifies the rewards smart contract 110.

The rewards smart contract 110 processes an API update method by updating the APR recorded at the smart contract with a new APR identified as a parameter of the APR update method.

Each period (e.g., Period 2, Period N, shown in FIG. 4), additional rewards can be generated (e.g., at S221', S221"), and such additional rewards can be processed (e.g., at S222') by further updating the unit price (e.g., at S223') and account balances (e.g., at S224'), and optimally updating the APR (e.g., at S225').

Figure 5:
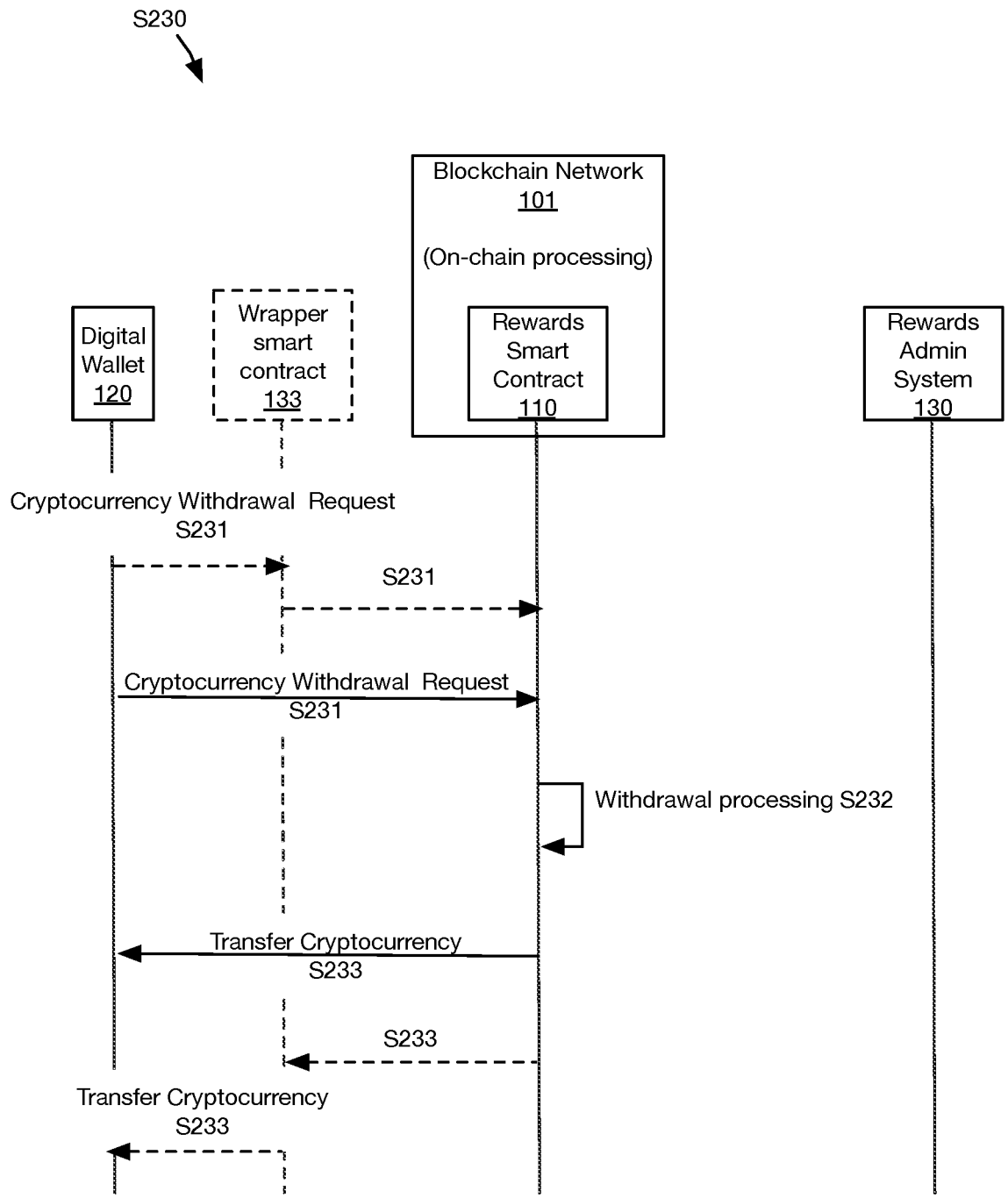
FIG. 5 is a representation of processing a withdrawal, in accordance with variations.

Processing a withdrawal S230 functions to transfer cryptocurrency assets to from the rewards smart contract 130 to a recipient address (example shown in FIG. 5).

S230 can be performed: when a blockchain block is mined, when a signed withdrawal transaction from the sender address is received (e.g., by the smart contract) (example shown in FIG. 9), after a lock-up period has expired, at the end of a rewards period, and/or at any other suitable time. In some implementations, the rewards smart contract 110 processes withdrawals without imposing a minimum lock-up period.

S230 can be performed atomically (e.g., within a single blockchain block), asynchronously, across multiple blocks, or otherwise performed. S230 is preferably performed using one or more signed transactions (e.g., signed by the private key associated with the depositing address or the user address; wherein gas is consumed), but can be otherwise performed.

S230 can include: identifying a cryptocurrency withdrawal request S231; verifying the withdrawal S232; and withdrawing the cryptocurrency S233 (example shown in FIG. 5).

Identifying a cryptocurrency withdrawal request S231 can include detecting a withdrawal transaction (e.g., by the rewards smart contract). The withdrawal transaction can be a signed blockchain transaction identifying: the rewards smart contract address (e.g., as an address hash, etc.), the withdrawal amount (e.g., cryptocurrency amount), the type of assets being withdrawn (e.g., ETH, USDC, other protocol, etc.), an invocation of the withdrawal function of the rewards smart contract, the withdrawing address (e.g., the sender's address, etc.), a withdrawal destination (e.g., recipient address that receives the withdrawal), and/or other information. For example, the withdrawal request can include a blockchain transaction, signed by a withdrawing address's private key, transferring a withdrawal amount of cryptocurrency to a target address (e.g., the sending address, a third address, etc.). In another example, the signed blockchain transaction is a withdrawal method-activation transaction for a withdrawal method of the rewards smart contract 110.

The withdrawing address is preferably a sending address (e.g., an address that previously deposited cryptocurrency into the rewards smart contract), but can alternatively be unknown to the rewards smart contract. The withdrawing address preferably has a nonzero balance with the rewards smart contract, but can alternatively have a zero balance (e.g., no units associated with the withdrawing address identifier).

The withdrawing address can be managed by a digital wallet 120 (e.g., be a user address), be a wrapper smart contract's address, and/or be any other suitable withdrawing address. For example, the digital wallet 120 can send a request to withdraw cryptocurrency (e.g., based on a requested amount) to the wrapper smart contact 133, which in turn forwards the request to the rewards smart contract 110 for processing (e.g., withdrawing the requested amount stored by the reward smart contract 110 on the blockchain network 101).

It is therefore appreciated that the cryptocurrency withdrawal request can be provided (at S231) by any suitable system that functions to generate (and optionally sign) a cryptocurrency withdrawal request, and broadcast the cryptocurrency withdrawal request to the blockchain network 101 that executes the rewards smart contract 110.

In an example, the withdrawal request (identified at S231) is a withdrawal request for withdrawing an amount of a stablecoin (e.g., fiat-backed stablecoin, such as USDC), and the request identifies an amount of the stablecoin to be withdrawn.

In variants, the withdrawal request is received (or recognized on-chain) by the rewards smart contract 110.

In variants, identifying the cryptocurrency withdrawal request S231 includes: the rewards smart contract 110 identifying, on a blockchain (e.g., implemented by the blockchain network 101 that executes the rewards smart contract 110, or a different blockchain network, e.g., 102, 103), a withdrawal method-activation transaction that identifies the withdrawal method of the rewards smart contract 110 and optionally specifies one or more withdrawal method parameters. In an example, the withdrawal method activation transaction identifies the account from which to withdraw the cryptocurrency, a value of cryptocurrency to be withdrawn, and a withdrawal destination (e.g., a blockchain account or address that is to receive the withdrawn cryptocurrency.

Verifying the withdrawal S232 functions to determine whether the withdrawing address is authorized to withdraw the requested amount.

The withdrawing address can be authorized to withdraw: up to the withdrawing address' balance with the rewards smart contract (e.g., the deposited amount and the earned rewards); up to the user's settled account value; more than the withdrawing address' balance (e.g., wherein the underlying asset transferred to the underlying asset reward system can be held as collateral on the resultant deficit or loan); and/or any other suitable amount. In a first example, users cannot withdraw an amount that is greater than the total value of any deposits plus the total value of any earned rewards. In a second example, the maximum amount of cryptocurrency (e.g., USDC) that can be withdrawn is the user's settled account value. In a third example, the rewards smart contract 110 enables an administrator to withdraw any cryptocurrency that is in excess of the liabilities of the rewards smart contract.

S232 can include one or more of: verifying that cryptocurrency can be withdrawn from the identified cryptocurrency account, verifying that the withdrawal request is signed by private key of a verified user, verifying that the withdrawal destination is a permitted withdrawal destination, and verifying that the value to be withdrawn is below a maximum withdrawal amount. However, any suitable verification process can be performed to verify the withdrawal request at S232.

In a first variation, verifying that cryptocurrency can be withdrawn from the identified cryptocurrency account can include verifying that the withdrawal identifier (e.g., withdrawal address) has sufficient units to satisfy the withdrawal. This can include: converting the requested amount to units (e.g., by dividing the requested amount by the current unit price) and verifying that the resultant units are below the unit balance associated with the withdrawing address (and/or are below the unit balance authorized for withdrawing address withdrawal). In a second variation, verifying that cryptocurrency can be withdrawn from the identified cryptocurrency account can include: calculating the account value for the withdrawing address by multiplying the number of units by the current unit price, and verifying that the requested amount is below the calculated account value (and/or authorized maximum value for withdrawal).

Withdrawing the cryptocurrency S233 functions to transfer the requested amount of cryptocurrency from the rewards smart contract 110 to the withdrawal destination identified by the withdrawal request. S233 can include: executing a function to send the requested amount to the withdrawal destination; generating and broadcasting a signed transaction (e.g., with the rewards smart contract) to send the requested amount to the withdrawal destination; or otherwise transferring the requested amount to the withdrawal destination. The withdrawal destination can be the withdrawing address, a third party address, or another address.

In a first example, the withdrawal destination is the depositing user's blockchain address.

In a second example, the withdrawal destination is the address of the wrapper smart contract 133. In this example, a user can have requested a withdrawal from the wrapper smart contract, wherein the wrapper smart contract can have verified that the user is authorized to withdraw the requested amount before subsequently withdrawing the requested amount (or the amount with additional processing fees) from the rewards smart contract. It is understood that the wrapper smart contract 133 can convert the withdrawn amount of cryptocurrency in a first format (e.g., a wrapped token such as WBTC on an Ethereum blockchain) to a second format (e.g., a BTC token), and then transfer at S233 the converted amount in the second format to the user's address.

The method can optionally include managing the rewards smart contract.

In variants, the method includes removing a verifier address from the smart contract by invoking a remove_verifier method of the rewards smart contract 110. For example, the KYC service system 140 can be removed as a valid verifier for the rewards smart contract 110.

In variants, the method includes revoking a signed attestation by invoking a revoke_attestation method of the rewards smart contract 110. Revoking a signed attestation functions to disallow use of a signed attestation by the rewards smart contract 110 to verify a user.

In variants, the method includes revoking a user verification by invoking a revoke_verification method of the rewards smart contract 110. Revoking a user verification functions to mark the user as unverified at the rewards smart contract 110, such that the user needs to be re-verified before using the rewards smart contract 110.

Figure 6:
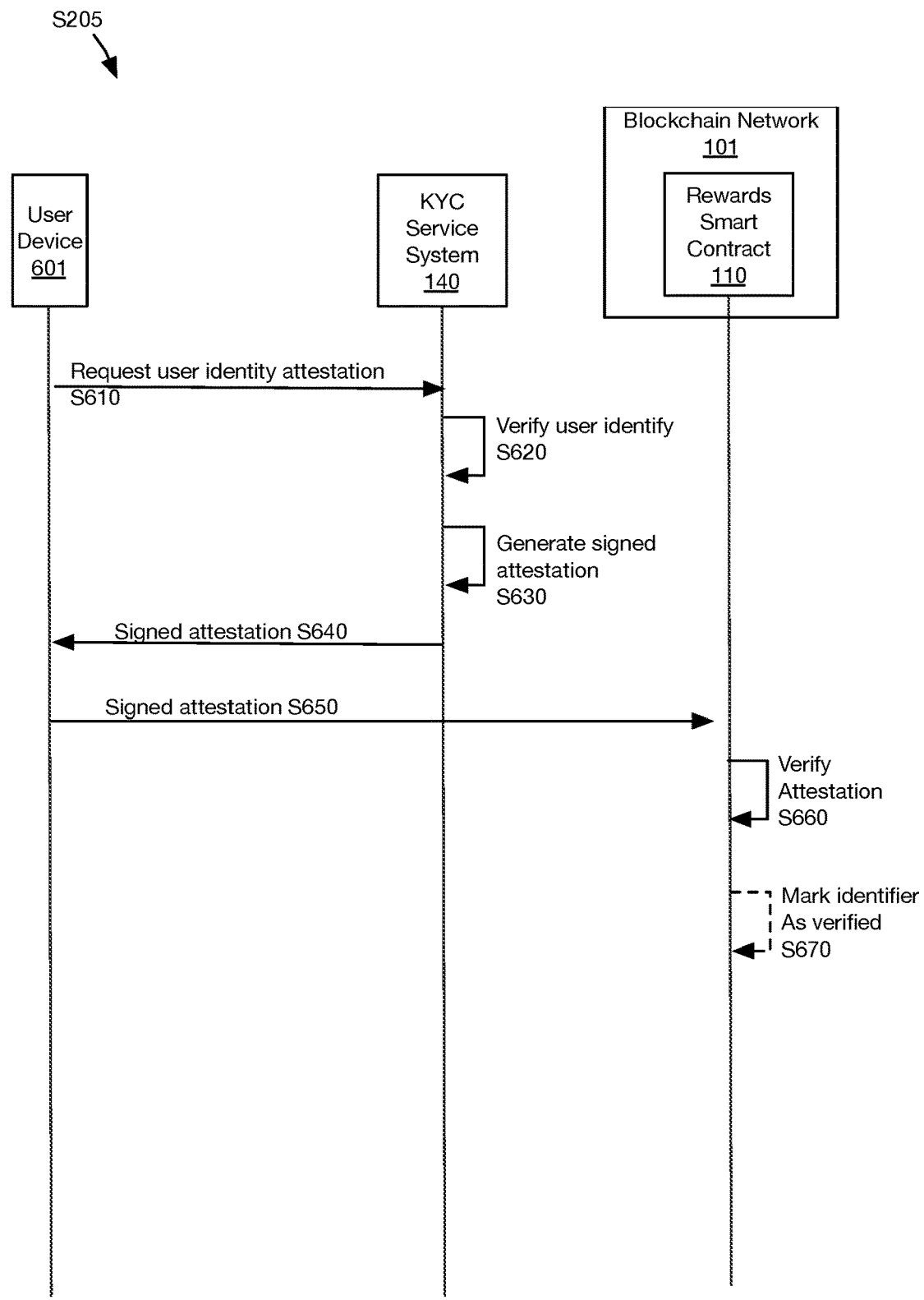
FIG. 6 is a representation of performing identity verification, in accordance with variations.

As shown in FIG. 2, the method can optionally performing identity verification S205 (example shown in FIG. 6).

In variants, performing identity verification S205 includes receiving a user identity attestation request S610. The identity attestation request can be received by a KYC service system 140, and the request can be provided by any suitable computing system (e.g., user device 601).

At S620, the KYC service system 140 performs a KYC process to verify a user identity associated with the user identity attestation request (received at S61o). The KYC service system 140 is preferably a system that has been registered with the rewards smart contract 110 as a registered verifier.

At S630, the KYC service system 140 generates a signed attestation, responsive to successful verification of the user identity at S62o. Generating a signed attestation at S630 can include cryptographically signing (with a private key of the KYC service system 140) an attestation that includes one or more of: a timestamp, a nonce, and a depositor identifier associated with the user identity attestation request. At S640, the KYC service system 140 provides the signed attestation to the computing system (e.g., user device 601) that provided the request at S610.

In variants, at S650, the computing system (e.g., 601) broadcasts a Verify_Identify method-activation transaction to the blockchain network 101. In variants, the Verify_Identify method is a method implemented by the rewards smart contract 110, and the Verify_Identify method-activation transaction identifies the rewards smart contract 110, the user identity to be verified, and the attestation generated at S630. By virtue of having the computing system that requests the attestation send the signed attestation to the smart contract, the KYC service system 140 is not responsible for payment of mining or gas fees related to broadcasting the Verify_Identify method-activation transaction.

In variants, at S66o, the rewards smart contract 110 (executed by the blockchain network 101) identifies (on the blockchain implemented by the blockchain network 101) the Verify_Identify method-activation transaction that was broadcasted by the computing system (e.g., 601) (at S650). In some implementations, responsive to identifying the Verify_Identify method-activation transaction, the rewards smart contract 110 verifies the user identity specified by the Verify_Identify method-activation transaction, by using the attestation identified by the Verify_Identify method-activation transaction.

In some implementations, the rewards smart contract 110 verifies the signed attestation (at S66o) by using a public key of the KYC service system 140. In some implementations, the public key of the KYC service system is registered with the rewards smart contract 110 by broadcasting an add-verifier method activation transaction to the blockchain network 101 (e.g., by the system, by the platform, by the rewards admin system 130, etc.). If the signed attestation is verified, then at S670 the rewards smart contract 110 marks the depositor identifier as verified in the rewards smart contract 110.

FIGS. 7A-F are representations of exemplary unit balances and recorded by a rewarder smart contract and the corresponding account values, in accordance with variations. In variants, the rewards smart contract 110 stores data on-chain that identifies the total number of units of the cryptocurrency held by each user of the rewards smart contract 110 (e.g., Alice, Bob, Charlie, shown in FIGS. 7C and 7F). As new deposits are made for a user (e.g., sending address), the total number of units owned by the user is updated. The unit price can change each time a new reward is deposited, and/or when a new deposit from another sending address is made.

FIG. 7A shows exemplary balances for users Alice and Bob for a first period (Period 0), at which the current unit price for the cryptocurrency (e.g., USDC) is 100. As shown in FIG. 7A, Alice has deposited 5,000 USDC and Bob has deposited 1,000 USDC (e.g., by broadcasting a blockchain transaction to transfer the cryptocurrency from their respective wallets to an on-chain account of the rewards smart contract 110. Since the current unit price for USDC is 100, the rewards smart contract 110 determines that the number of units deposited by Alice is 50, and that the number of deposited units for Bob is 10.

As shown in FIG. 7B, at the beginning of Period 1, settlement occurs and the unit price increases by the reward rate for the period. Since the unit price increases, the account values increase (e.g., new account value=<new unit price>*<# of units>). This increase in account value represents the reward earned at the beginning of Period 1.

As shown in FIG. 7C, after settlement occurs at Period 1, Charlie deposits cryptocurrency (e.g., USCC) in the amount of 10,000 into the rewards smart contract 110. The smart contract 110 assigns 99.0099 . . . units instead of 100 units because the unit price has already gone up to 101.

As shown in FIG. 7D, at the beginning of the next period (Period 2), the unit price becomes 101*101%–102.1, and the new account values are shown in FIG. 7D.

As shown in FIG. 7E, existing depositors can deposit more cryptocurrency into the rewards smart contract 110. New units are assigned based on the current unit price, and not the earlier unit price of a previous period. As shown in FIG. 7E, Alice deposits an additional 6,000 of the cryptocurrency, and Bob deposits an additional 2,000 of the cryptocurrency.

As shown in FIG. 7F, at a next period (Period 3), additional rewards are earned, based on the total number of units owned by each user. The total number of units includes the total of all deposits made by the user.

The process of updating account values repeats as each new reward is deposited (e.g., periodically at a given reward period). In some variations, the APR is variable and can change at any time. The APR can be updated or kept the same at every reward generation period.

In a first variant, the rewards smart contract 110 does not use funds held by the smart contract. In a second variant, the rewards smart contract 110 uses at least a portion of the funds held by the smart contract. The funds can be used for one or more of: lending to a borrower, purchasing new assets, paying for services, or any other suitable purpose.

Figure 8:
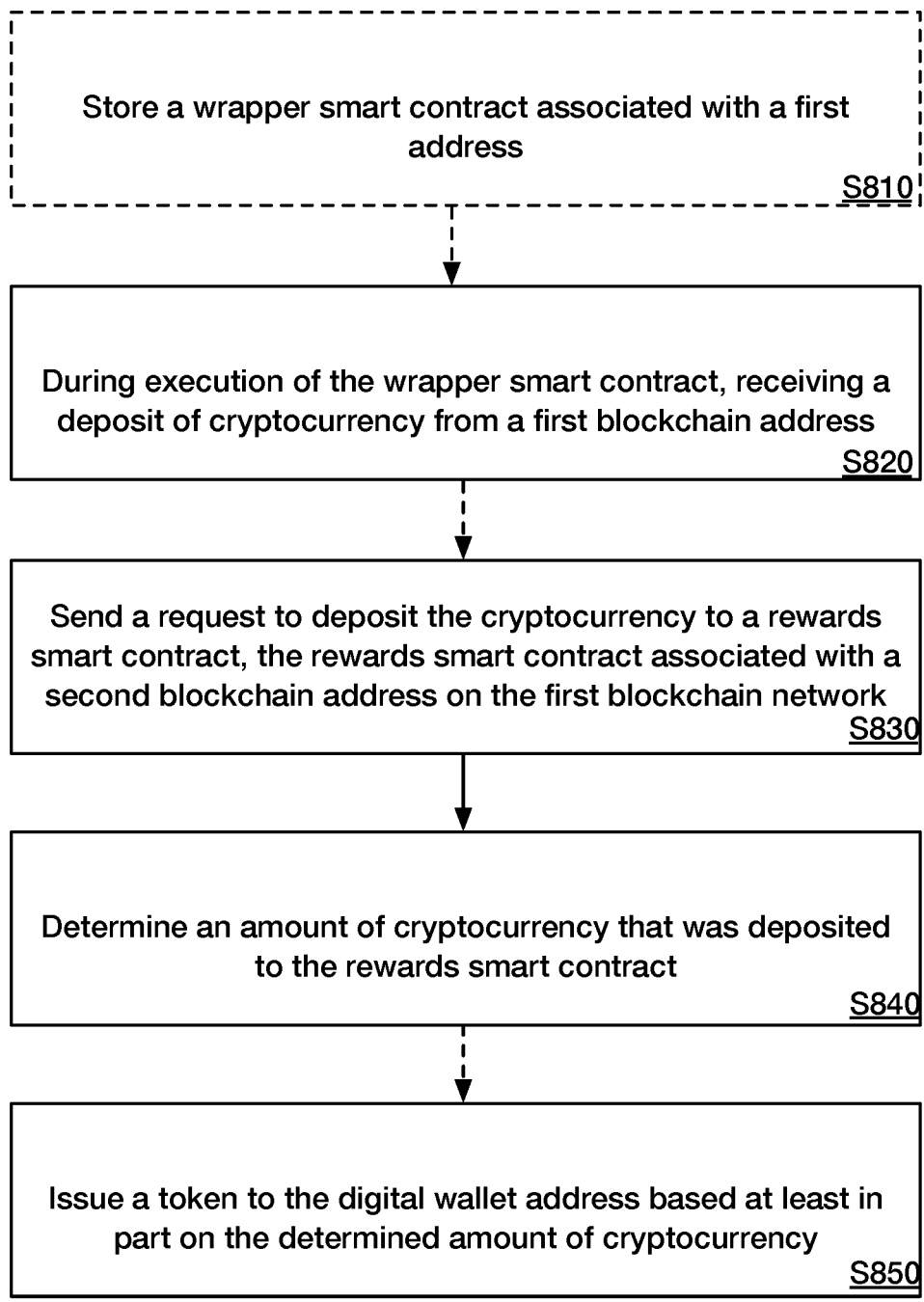
FIG. 8 is a representation of a variant of the method.

In variants leveraging a wrapper smart contract, the method can additionally or alternatively include: storing a wrapper smart contract associated with a first address on a first blockchain network S810; during execution, the wrapper smart contract receiving a deposit of cryptocurrency from a digital wallet, the digital wallet associated with a digital wallet address corresponding to a first user S820; sending a request to deposit the cryptocurrency to a rewards smart contract, the rewards smart contract associated with a first blockchain address on the first blockchain network, the request being associated with the first address of the wrapper smart contract S830; determining an amount of cryptocurrency (e.g., reward units) that was deposited to the rewards smart contract S840; and issuing a token to the digital wallet address corresponding to the first user based at least in part on the determined amount of cryptocurrency (e.g., the number of reward units) S850. An example is shown in FIG. 8. In embodiments, the token can represent a second amount of cryptocurrency, the second amount of cryptocurrency based on a difference between the amount of cryptocurrency and a transaction fee associated with the first blockchain network. The assets deposited into the rewards smart contract can be stored in association with the wrapper smart contract's identifier (e.g., address).

In some implementations, the method includes storing the rewards smart contract on the first blockchain network; wherein during execution, the rewards smart contract performs the operations of: optionally verifying the request to deposit the cryptocurrency based on a depositor identifier, the request to depositing the cryptocurrency including a first amount of cryptocurrency assets to deposit, wherein the depositor identifier comprises an account of an account-based blockchain protocol or an address of a UTXO-based blockchain protocol; determining a deposited amount of units, the deposited amount of units corresponding to the deposited amount of cryptocurrency; storing the deposited amount of units in association with the depositor identifier; and periodically updating the unit price.

In these implementations, determining the deposited amount of units comprises: identifying a current unit price for the deposited amount of units; and dividing the deposited amount of units by a current unit price for the cryptocurrency.

In these implementations, additionally, during execution, the rewards smart contract further perform the operations of: receiving, by the rewards smart contract, new cryptocurrency for a reward corresponding at least in part to the deposited amount of cryptocurrency assets. In variants, the new cryptocurrency was acquired by minting the new cryptocurrency or purchasing the new cryptocurrency from an exchange or third party. The new cryptocurrency for the reward can be sent to the rewards smart contract via a blockchain transaction (e.g., reward settlement method-activation transaction) broadcasted to the first blockchain network.

In these implementations, prior to the reward settlement method-activation transaction being broadcasted to the first blockchain network, the method can include determining that the rewards smart contract includes sufficient funds for the reward, where determining that the rewards smart contact includes sufficient funds for the reward comprises accessing blockchain data corresponding to available funds stored by the rewards smart contract.

In these implementations, prior to the reward settlement method-activation transaction being broadcasted to the first blockchain network, the method can include determining that the rewards smart contact includes insufficient funds for the reward, and receives, by the rewards smart contract, an amount of additional funds to enable issuing the reward.

In these implementations, the method can optionally include sending a request for an audit log to the rewards smart contract at the first blockchain address on the first blockchain network; and receiving, from the rewards smart contract, information related to the audit log in response to the request.

In an example, the method can include: at a rewards smart contract: receiving a cryptocurrency deposit from a sending address; converting the cryptocurrency deposit into units based on a cryptocurrency-to-unit conversion; storing the units in association with the sending address; determining and storing a cryptocurrency-to-unit conversion; and enabling withdrawal of up to a second amount of cryptocurrency, determined based on the number of units and the updated cryptocurrency-to-unit conversion, by the sending address. The cryptocurrency deposit and withdrawal are preferably implemented via a blockchain transaction, signed by a private key associated with the sending address. The rewards smart contract preferably repeats the method for each of a plurality of sending addresses. In specific examples, the rewards smart contract does not track the cryptocurrency deposit amount, nor does it track the updated cryptocurrency balances per ending address. The cryptocurrency-to-unit conversion can be updated with a blockchain transaction, signed by an administrator address' private key, specifying the updated cryptocurrency-to-unit conversion (e.g., wherein the signed blockchain transaction calls the cryptocurrency-to-unit conversion update function of the rewards smart contract). In this variant, the solvency of the rewards smart contract can be verified (e.g., by the smart contract or an offchain system) before updating the cryptocurrency-to-unit conversion (e.g., verify that the total number of units multiplied by the updated cryptocurrency-to-unit conversion is less than the balance of the cryptocurrency stored by the remote smart contract). Alternatively, the cryptocurrency-to-unit conversion can be updated by sending a rewards deposit (e.g., from the administrator address, via a signed transaction) to the rewards smart contract. However, the method can be otherwise performed.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

I claim:
1. A system comprising:
at least one hardware processor; and
a memory storing instructions that cause the at least one hardware processor to perform operations comprising:
   storing a rewards smart contract on a first blockchain network;
   wherein, during execution, the rewards smart contract performs a method comprising:
      receiving, via a signed blockchain transaction executing on the first blockchain network, a first deposit comprising a first amount of cryptocurrency transferred from a sending blockchain address to an address of the rewards smart contract, wherein the signed blockchain transaction originated from a digital wallet;
      determining a deposited amount of units based on the first amount of cryptocurrency and a cryptocurrency-to-unit ratio;
      storing the deposited amount of units in association with the sending blockchain address;
      receiving a rewards deposit comprising a second amount of cryptocurrency;
      receiving a withdrawal request from the sending blockchain address, the withdrawal request indicating a withdrawal amount via a second signed blockchain transaction; and
      transferring the withdrawal amount to the sending blockchain address.

2. The system of claim 1, wherein determining the deposited amount of units comprises dividing the deposited amount of units by an updated cryptocurrency-to-unit ratio.

3. The system of claim 1, wherein the rewards deposit is received via a signed transaction on the first blockchain network.

4. The system of claim 1, wherein the second amount of cryptocurrency corresponds at least in part to the first amount of cryptocurrency, wherein the second amount of cryptocurrency is acquired by minting new cryptocurrency or purchasing the new cryptocurrency from an exchange or third party.

5. The system of claim 1, wherein the rewards deposit is received via a reward settlement method-activation transaction broadcast to the first blockchain network.

6. The system of claim 5, wherein, prior to the reward settlement method-activation transaction being broadcasted to the first blockchain network, the rewards smart contract is confirmed to be solvent based on blockchain data corresponding to available funds stored by the rewards smart contract.

7. The system of claim 1, wherein the rewards deposit is received after the rewards smart contract is confirmed to be insolvent based on blockchain data corresponding to available funds stored by the rewards smart contract.

8. The system of claim 1, wherein the operations further comprise:
   storing a wrapper smart contract, identified by the sending blockchain address, on the first blockchain network;
   wherein, during execution, the wrapper smart contract performs a method comprising:

issuing a cryptocurrency token to the digital wallet corresponding to the deposited amount of units, wherein the cryptocurrency token is a different cryptocurrency from the first deposit.

9. The system of claim 1, wherein the operations further comprise:
   sending a request for an audit log to the rewards smart contract at a first blockchain address on the first blockchain network; and
   receiving, from the rewards smart contract, information related to the audit log in response to the request.

10. The system of claim 1, wherein the method further comprises: verifying an identity of a user associated with the sending blockchain address before storing the deposited amount of units in association with the sending blockchain address.

11. A method, executing on at least one hardware processor, comprising:
   storing a rewards smart contract on a first blockchain network;
   wherein, during execution, the rewards smart contract performs operations comprising:
      receiving, via a signed blockchain transaction executing on the first blockchain network, a first deposit comprising a first amount of cryptocurrency transferred from a sending blockchain address to an address of the rewards smart contract, wherein the signed blockchain transaction originated from a digital wallet;
      determining a deposited amount of units based on the first amount of cryptocurrency and a cryptocurrency-to-unit ratio;
      storing the deposited amount of units in association with the sending blockchain address;
      receiving a rewards deposit comprising a second amount of cryptocurrency;
      receiving a withdrawal request from the sending blockchain address, the withdrawal request indicating a withdrawal amount via a second signed blockchain transaction; and
      transferring the withdrawal amount to the sending blockchain address.

12. The method of claim 11, wherein determining the deposited amount of units comprises dividing the deposited amount of units by an updated cryptocurrency-to-unit ratio.

13. The method of claim 11, wherein the rewards deposit is received via a signed transaction on the first blockchain network.

14. The method of claim 11, wherein the second amount of cryptocurrency corresponds at least in part to the first amount of cryptocurrency and wherein the second amount of cryptocurrency is acquired by minting new cryptocurrency or purchasing the new cryptocurrency from an exchange or third party.

15. The method of claim 11, wherein the rewards deposit is received via a reward settlement method-activation transaction broadcast to the first blockchain network.

16. The method of claim 15, wherein, prior to the reward settlement method-activation transaction being broadcasted to the first blockchain network, the rewards smart contract is confirmed to be solvent based on blockchain data corresponding to available funds stored by the rewards smart contract.

17. The method of claim 11, wherein the operations further comprise:
   storing a wrapper smart contract, identified by the sending blockchain address, on the first blockchain network;
   wherein, during execution, the wrapper smart contract performs a method comprising:
      issuing a cryptocurrency token to the digital wallet corresponding to the deposited amount of units, wherein the cryptocurrency token is a different cryptocurrency from the first deposit.

18. The method of claim 11, further comprising:
   sending, by the at least one hardware processor, a request for an audit log to the rewards smart contract at a first blockchain address on the first blockchain network; and
   receiving, from the rewards smart contract, information related to the audit log in response to the request.

19. The method of claim 11, wherein the operations further comprise: verifying an identity of a user associated with the sending blockchain address before storing the deposited amount of units in association with the sending blockchain address.

20. One or more non-transitory computer-readable media storing computer-executable instructions that, when executed by one or more hardware processors, cause the one or more hardware processors to:
   store a rewards smart contract on a first blockchain network;
   wherein, during execution, the rewards smart contract performs operations comprising:
      receiving, via a signed blockchain transaction executing on the first blockchain network, a first deposit comprising a first amount of cryptocurrency transferred from a sending blockchain address to an address of the rewards smart contract, wherein the signed blockchain transaction originated from a digital wallet;
      determining a deposited amount of units based on the first amount of cryptocurrency and a cryptocurrency-to-unit ratio;
      storing the deposited amount of units in association with the sending blockchain address;
      receiving a rewards deposit comprising a second amount of cryptocurrency;
      receiving a withdrawal request from the sending blockchain address, the withdrawal request indicating a withdrawal amount via a second signed blockchain transaction; and
      transferring the withdrawal amount to the sending blockchain address.

* * * * *